(12) United States Patent
Murray (10) Patent No.: US 10,988,086 B2
(45) Date of Patent: Apr. 27, 2021

(54) HAT HOLDER DEVICE

(71) Applicant: Chad Murray, Laguna Niguel, CA (US)

(72) Inventor: Chad Murray, Laguna Niguel, CA (US)

( * ) Notice: Subject to any disclaimer, the term of this patent is extended or adjusted under 35 U.S.C. 154(b) by 0 days.

(21) Appl. No.: 16/364,379

(22) Filed: Mar. 26, 2019

(65) Prior Publication Data

US 2019/0315282 A1 Oct. 17, 2019

Related U.S. Application Data

(60) Provisional application No. 62/656,116, filed on Apr. 11, 2018.

(51) Int. Cl.
| | | |
|---|---|---|
| *B60R 7/10* | (2006.01) | |
| *B60J 3/02* | (2006.01) | |
| *B60R 7/05* | (2006.01) | |
| *A42B 1/0182* | (2021.01) | |

(52) U.S. Cl.
CPC .............. *B60R 7/10* (2013.01); *A42B 1/0182* (2021.01); *B60J 3/0204* (2013.01); *B60R 7/05* (2013.01)

(58) Field of Classification Search
CPC .. B60R 7/10; B60R 7/05; A47G 25/10; A42B 1/002
See application file for complete search history.

(56) References Cited

U.S. PATENT DOCUMENTS

| | | | |
|---|---|---|---|
| 2,718,414 A | | 9/1955 | Knox et al. |
| 5,074,508 A | * | 12/1991 | Powers ..................... B60R 7/10 211/31 |
| 5,429,335 A | | 7/1995 | Cunningham |
| 5,573,217 A | * | 11/1996 | Garvey ..................... B60R 7/05 248/316.7 |
| 5,685,465 A | * | 11/1997 | Berardis ................ A42B 1/002 211/30 |
| 6,481,060 B1 | | 11/2002 | Tsai |
| 2002/0162194 A1 | * | 11/2002 | Ainley ..................... B60R 7/05 24/3.3 |
| 2005/0263461 A1 | | 12/2005 | Heim |
| 2007/0235484 A1 | * | 10/2007 | Staniszewski ............ B60R 7/05 224/312 |
| 2008/0314332 A1 | * | 12/2008 | Jacobs ................. A01K 5/0114 119/709 |
| 2009/0119819 A1 | * | 5/2009 | Thompson ............. A42B 1/002 2/209.13 |
| 2017/0049219 A1 | * | 2/2017 | Seals ...................... A42B 1/002 |

* cited by examiner

*Primary Examiner* — Scott T McNurlen
(74) *Attorney, Agent, or Firm* — Boudwin Intellectual Property; Daniel Boudwin (57) ABSTRACT

A hat holder device for securing a billed hat to a surface. The hat holder device includes an upper wall attached to a lower wall, forming a bill pocket therebetween configured to slidably and removably secure a bill of the billed hat therein. The upper wall is attached to the lower wall by two attachment blocks, or enclosed stitching, and the upper wall is attachable to the surface by any suitable means, including clips, straps, and the like. The hat holder device is useful for securing the billed hat to a visor of a vehicle, a headrest of the vehicle, a backpack, an interior wall of a building, an exterior wall of the building, or any other surface.

19 Claims, 13 Drawing Sheets

HAT HOLDER DEVICE

CROSS REFERENCE TO RELATED APPLICATIONS

This application claims priority under 35 U.S.C. § 119(e) to U.S. Provisional Application No. 62/656,116 filed on Apr. 11, 2018. The above identified patent application is incorporated by reference herein in its entirety to provide continuity of disclosure.

BACKGROUND OF THE INVENTION

The present invention relates to a hat holder device for securing a billed hat to a surface.

Individuals often wear billed hats. Protection of a billed hat, to prevent a collapse of a crown of the billed hat, may require an individual to place the billed hat in a location that would reduce a likelihood of the billed hat being stepped on, sat on, or otherwise compressed. This often involves placing the billed hat in a location that is not frequented by the individual, and may result in misplacing or losing the billed hat between uses.

Therefore, there is a need in the art for a hat holder device for securing a billed hat to a surface, and which reduces a likelihood of compression or damage to the hat. The present invention addresses this unmet need.

Devices have been disclosed in the art that relate to hat holder devices. These include devices that have been patented and published in patent application publications. These devices are often unable to both effectively hold a billed hat and protect the billed hat from damage. In view of the devices disclosed in the art, it is submitted that there is a need in the art for an improvement to existing hat holder devices. In view of the present disclosure, it is submitted that the present invention substantially diverges in structural and functional elements from devices in the art, and substantially fulfills an unmet need in the art.

SUMMARY OF THE INVENTION

In view of the disadvantages inherent in the known types of hat holder devices in the art, the present invention provides a new and improved hat holder device, wherein the same can be utilized for securing a billed hat to a surface.

It is therefore an object of the present invention to provide a hat holder device for securing a billed hat to a surface.

Another object of the present invention is to provide a hat holder device that may be readily manufactured from materials that permit relative economy and are commensurate with durability.

In one aspect, the invention provides a hat holder device for securing a billed hat to a surface, comprising an upper wall, attached to a lower wall by a pair of attachment blocks and/or enclosed stitching. The upper wall and the lower wall are sized to form a bill pocket therebetween configured to removably secure a bill of the billed hat therein, and an upper surface of the upper wall is attachable to the surface. In some embodiments, the upper wall is attached to the lower wall by stitching, such as enclosed stitching. In such embodiments, the enclosed stitching may be used alone or in combination with the pair of attachment blocks (i.e., a left attachment block and a right attachment block) to attach the upper wall to the lower wall. Generally, the bill pocket is sized and configured to accept a bill of a billed hat therein, and to secure the bill therein by friction fit.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, an exemplary embodiment of the invention and manners in which it may be made and used may be better understood after a review of the following description, taken in connection with the accompanying drawings, wherein like numeral annotations are provided throughout.

DETAILED DESCRIPTION OF THE INVENTION

Reference is made herein to the attached drawings. Like reference numerals are used throughout the drawings to depict like or similar elements of the hat holder device. The figures are intended for representative purposes only and should not be considered limiting in any respect.

Figure 1:
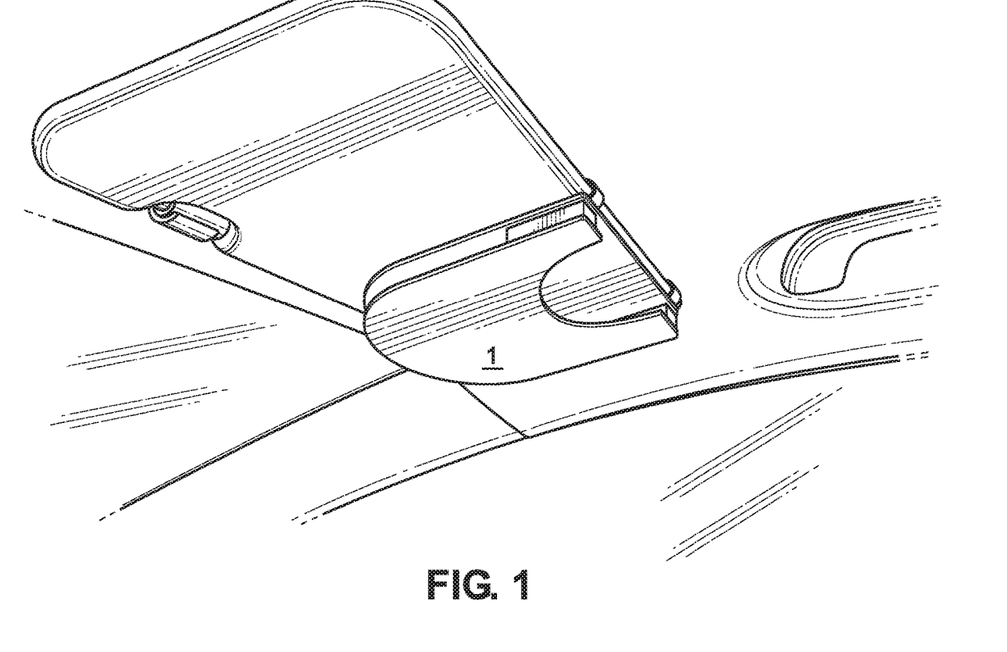
FIG. 1 depicts a perspective view of an exemplary hat holder device attached to a visor of a vehicle.
Figure 2:
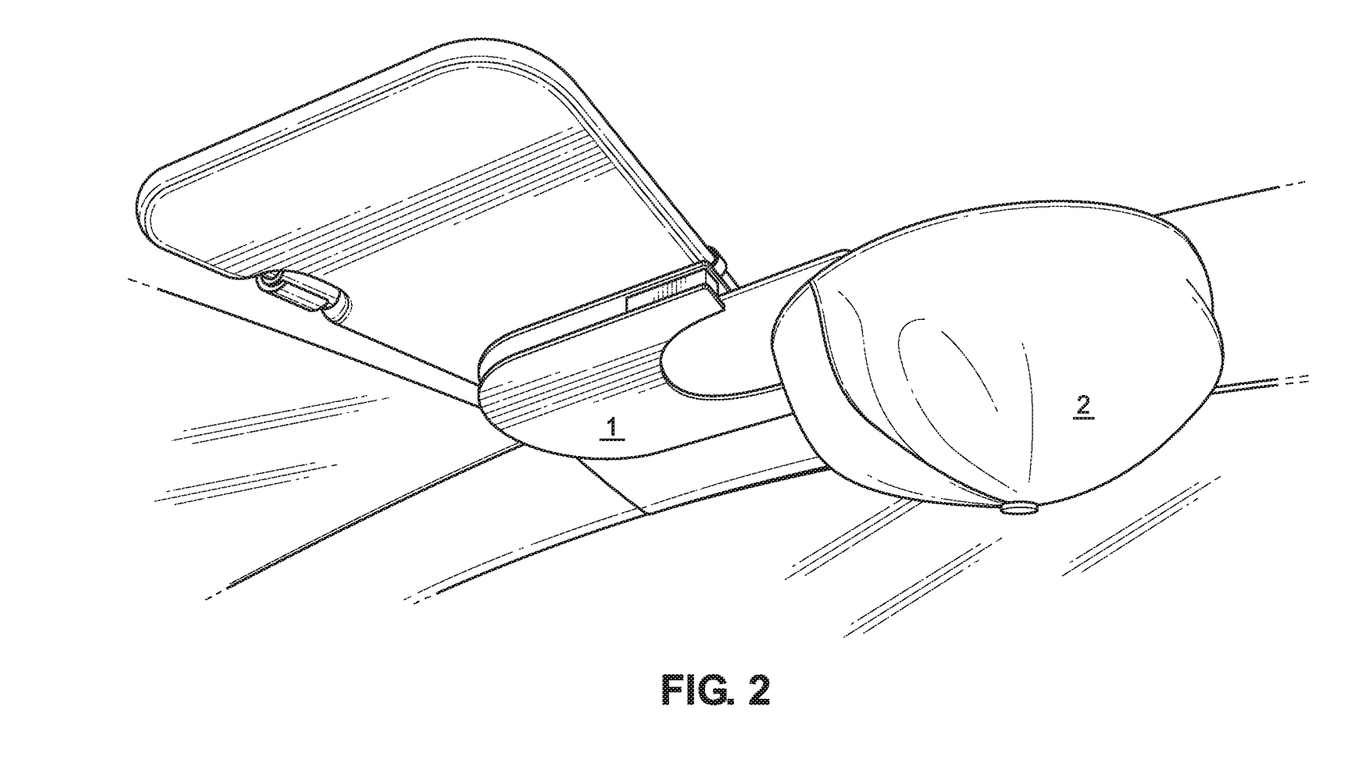
FIG. 2 depicts a perspective view of the exemplary hat holder device attached to the visor of the vehicle, with a billed hat partially inserted into a bill pocket of the exemplary hat holder device.
Figure 3:
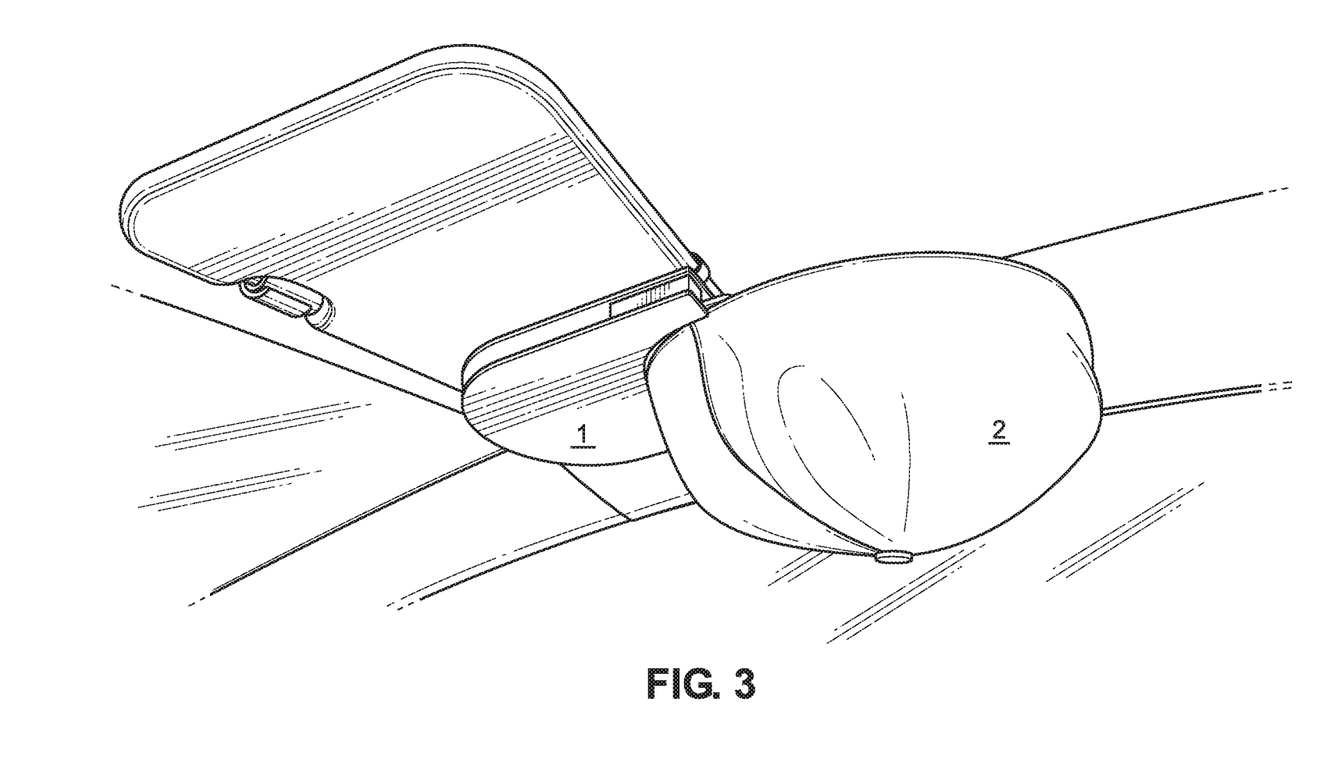
FIG. 3 depicts a perspective view of the exemplary hat holder device attached to the visor of the vehicle, with the billed hat fully inserted into the bill pocket of the exemplary hat holder device.

Referring now to FIGS. 1-3, there are depicted perspective views of an exemplary hat holder device attached to a visor of a vehicle (FIG. 1), with a billed hat either partially (FIG. 2) or fully (FIG. 3) inserted into a bill pocket of the exemplary hat holder device. The hat holder device 1 is shown attached to a visor of a vehicle, a surface that is highly visible, and which reduces a likelihood of compression or damage to the billed hat when not in use. In the shown embodiment, a bill of a billed hat 2 is slidably inserted into a bill pocket of the hat holder device 1, thereby removably securing the bill of the billed hat therein by a friction fit. The bill pocket is configured to removably secure the bill of the billed hat 2 therein by frictional engagement between an inner surface of a lower wall of the hat holder device 1 and an upper surface of the bill of the billed hat 2, and by frictional engagement between an inner surface of an upper wall of the hat holder device 1 and a lower surface of the bill of the billed hat 2. In this manner, the billed hat 2 may be secured in the hat holder device 1 in an upside down orientation.

Figure 4:
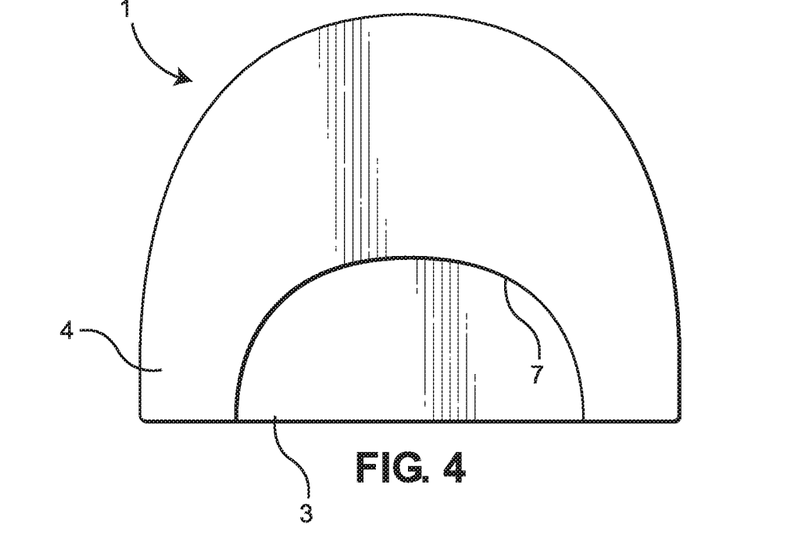
FIG. 4 depicts a bottom view of the exemplary hat holder device.
Figure 5:
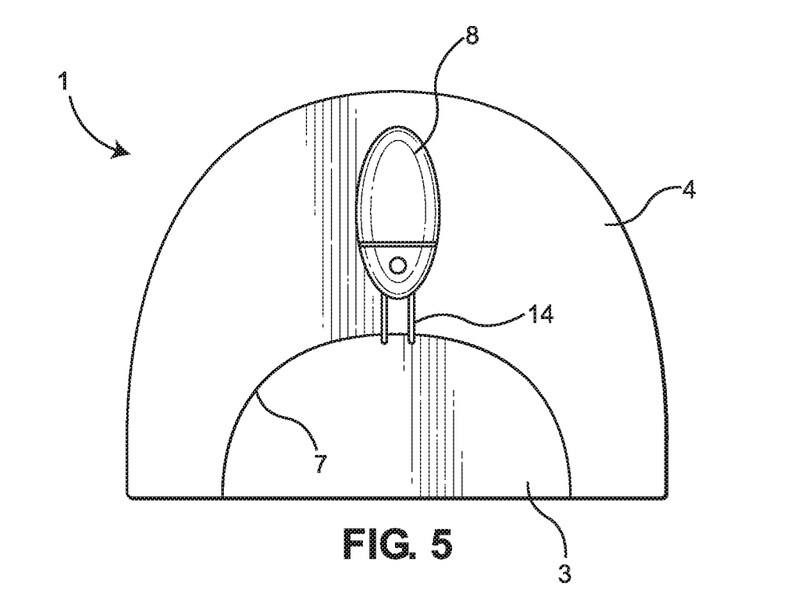
FIG. 5 depicts a bottom view of the exemplary hat holder device, having a sunglasses clip attached thereto.
Figure 6:
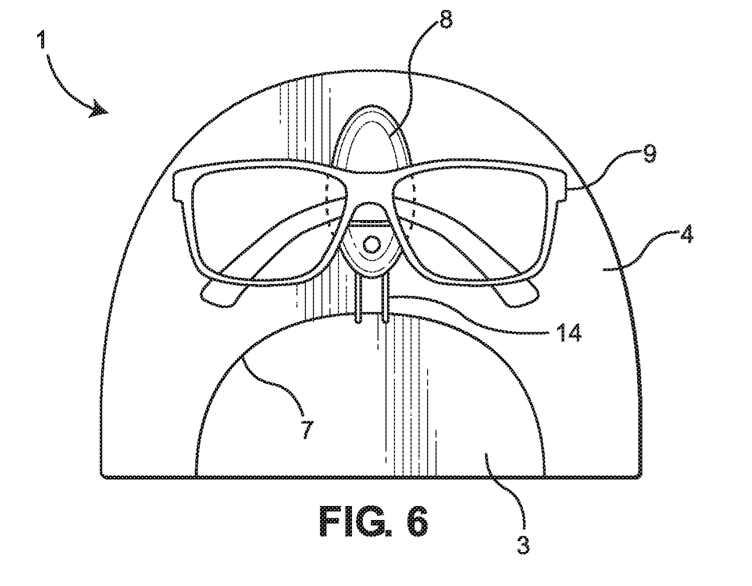
FIG. 6 depicts a bottom view of the exemplary hat holder device, having the sunglasses clip attached thereto, with a pair of sunglasses held by the sunglasses clip.

Referring now to FIGS. 4-6, there are depicted bottom views of the exemplary hat holder device (FIG. 4), having a sunglasses clip attached thereto (FIG. 5), with a pair of sunglasses held by the sunglasses clip (FIG. 6). An upper wall 3 of the hat holder device 1 is attached to a lower wall 4 of the hat holder device 1. The lower wall 4 includes a curved cutout 7, configured to frictionally engage with an upper surface of the bill of the billed hat. In this manner, an upward slope of the bill of the billed hat is accompanied by the curved cutout 7.

In some embodiments, a sunglasses holder is attached to the lower wall 4, such that the sunglasses holder is configured to store a pair of sunglasses 9 on the hat holder device 1. In the shown embodiment, the sunglasses holder includes a sunglasses clip 8 configured to removably secure the pair of sunglasses 9 by engaging a frame of the pair of sunglasses 9, and the sunglasses clip 8 is secured to the curved cutout 7 of the lower wall 4 by a sunglasses holder attachment 14. In this manner, a location of both the billed hat and the pair of sunglasses 9 is conveniently accessible to an individual storing these items when not in use.

Figure 7:
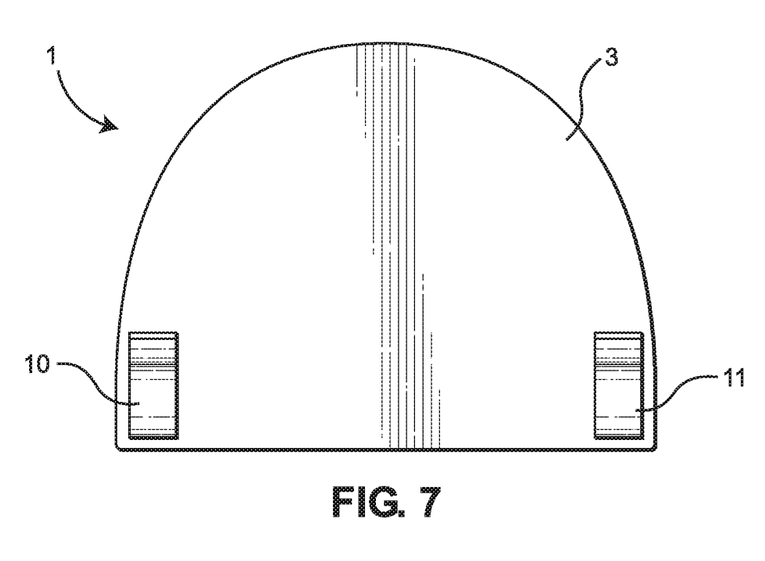
FIG. 7 depicts a top view of the exemplary hat holder device, having a pair of clips attached thereto, configured to secure the exemplary hat holder device to a surface.
Figure 8:
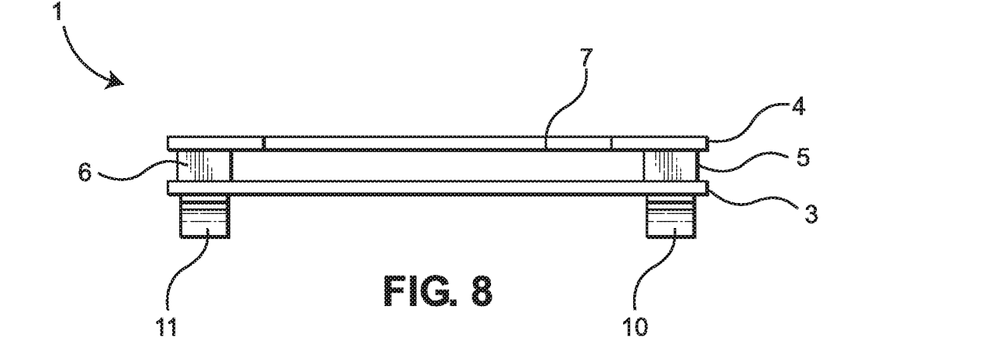
FIG. 8 depicts a rear view of the exemplary hat holder device, having the pair of clips attached thereto.
Figure 9:
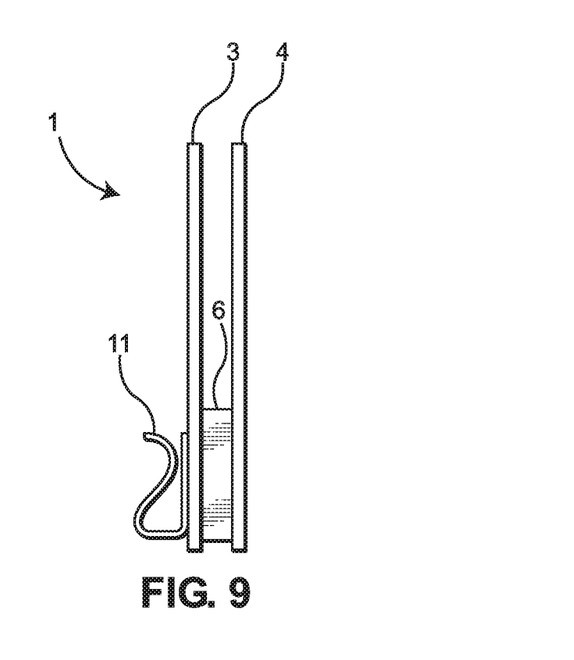
FIG. 9 depicts a side view of the exemplary hat holder device, having the pair of clips attached thereto.

Referring now to FIGS. 7-9, there are depicted a top view (FIG. 7), a rear view (FIG. 8), and a side view (FIG. 9) of the exemplary hat holder device, having a pair of clips attached thereto, configured to secure the exemplary hat holder device to a surface. In the shown embodiment, the upper surface of the upper wall 3 of the hat holder device 1 is attachable to the surface by a left clip 10 and a right clip 11. In this manner, the hat holder device 1 is securely attachable to the surface, and a probability of the hat holder device 1 detaching from the surface is minimized.

In some embodiments, the hat holder device 1 includes the upper wall 3, attached to the lower wall 4 by a left attachment block 5 and a right attachment block 6. The upper wall 3, the lower wall 4, the left attachment block 5, and the right attachment block 6 are sized to form the bill pocket therebetween configured to removably secure the bill of the billed hat therein, and the upper surface of the upper wall 3 is attachable to the surface, as described elsewhere herein. In some embodiments, the left clip 10 and the right clip 11 are secured to the upper surface of the upper wall 3 by penetrative means, such as screws, nails, staples, and the like, thereby anchoring the left clip 10 and the right clip 11 to the left attachment block 5 and the right attachment block 6, respectively. In this manner, the left clip 10 and the right clip 11 are structurally durable and capable of withstanding substantial forces endured during use of the hat holder device 1, such as during attachment to or detachment from the surface.

It is contemplated that a curvature of the upper wall 3 and a curvature of the lower wall 4 may be adjustable, so that the curvatures of the walls (3, 4) may be molded as desired by the individual using the hat holder device 1. In this manner, the individual may conform the curvatures of the walls (3, 4), and therefore a curvature of the bill pocket, to the bill of the billed hat to maintain a curvature of the bill of the billed hat when the billed hat is stored in the bill pocket of the hat holder device 1. Alternatively, the individual may conform the curvature of the bill of the billed hat to the curvature of the bill pocket, to initiate, transition, or establish the curvature of the bill of the billed hat to the curvature of the bill pocket so defined and molded by the individual. In this manner, a preferred curvature of the bill of the billed hat may be maintained or obtained by the individual according to any inclination of the individual, as preferences or styles change or evolve with time.

It is also contemplated that the curvature of the upper wall 3 and the curvature of the lower wall 4 may not be adjustable, so that the curvatures of the walls (3, 4) may not be molded by the individual using the hat holder device 1. In this manner, a rigidity of the walls (3, 4) is maintained and is sufficient so as to firmly secure the bill of the billed hat within the bill pocket, or so as to maintain the curvature of the bill of the billed hat when the billed hat is stored in the bill pocket of the hat holder device 1.

Accordingly, the walls (3, 4) may be flat and parallel, thereby defining a flat bill pocket for securing, molding, or maintaining the curvature of the bill of the billed hat, such that the curvature is minimal or such that the bill of the billed hat is flat or mostly flat. Alternatively, the walls (3, 4) may be curved and parallel, thereby defining a curved bill pocket for securing, molding, or maintaining the curvature of the bill of the billed hat, such that the curvature is not minimal or such that the bill of the billed hat is curved or mostly curved. Consistent with other aspects of the present invention, the curvature, a shape, or another property of such flat or curved walls (3, 4) may be permanent, semi-permanent, not permanent, user-defined, semi-user-defined, or not user-defined, as would be understood by the individual using the hat holder device 1. In this manner, a manufacture and a use of the hat holder device 1 is customizable according to an inclination of a person having ordinary skill in the art, or according to a demand of a marketplace. In this manner, a utility and an enjoyment of the present invention are maximized, and the present invention is advantageous compared to other hat holder devices.

In some embodiments, at least one of the clips (10, 11) is biased to apply a pinching force to the surface sufficient to removably attach the hat holder device 1 to the surface. In at least these embodiments, the hat holder device 1 is configured to be secured to a flat surface. Alternatively, the pinching force of the at least one biased clip may be used to secure the hat holder device 1 to a looped surface, such as a strap of a backpack, and the like.

In some embodiments, both of the clips (10, 11) are biased to apply the pinching force to the surface sufficient to removably attach the hat holder device 1 to the surface. Similarly, the hat holder device 1 is configured to be secured to the flat surface, or to a looped surface, such as a strap of a backpack, and the like. In this manner, a magnitude of the pinching force is maximized, thereby minimizing the probability of the hat holder device 1 detaching from the surface.

Figure 10:
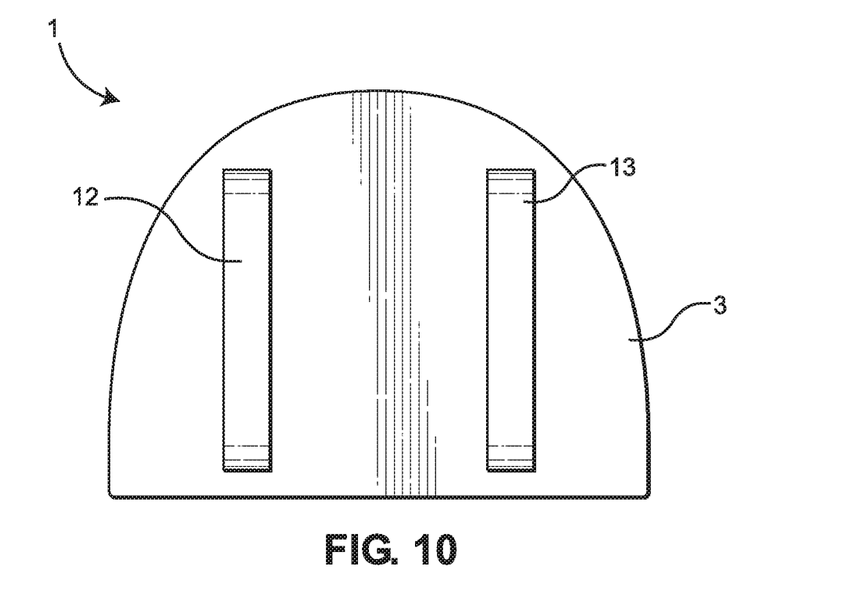
FIG. 10 depicts a top view of the exemplary hat holder device, having a pair of straps attached thereto, configured to secure the exemplary hat holder device to the surface.
Figure 11:
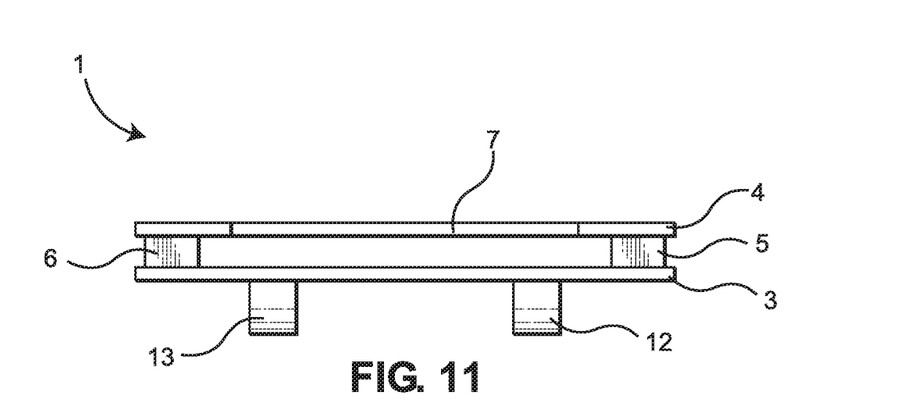
FIG. 11 depicts a rear view of the exemplary hat holder device, having the pair of straps attached thereto.
Figure 12:
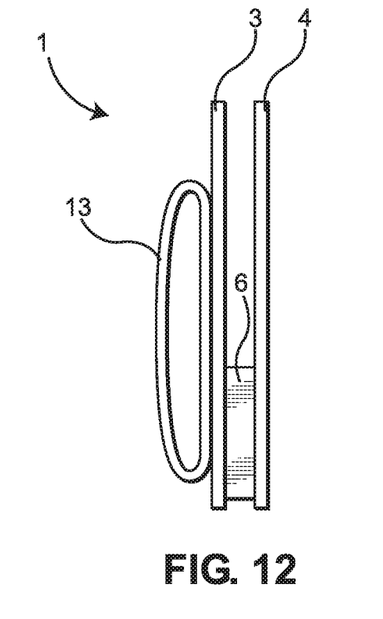
FIG. 12 depicts a side view of the exemplary hat holder device, having the pair of straps attached thereto.

Referring now to FIGS. 10-12, there are depicted a top view (FIG. 10), a rear view (FIG. 11), and a side view (FIG. 12) of the exemplary hat holder device, having a pair of straps attached thereto, configured to secure the exemplary hat holder device to a surface. In the shown embodiment, the upper surface of the upper wall 3 of the hat holder device 1 is attachable to the surface by a left strap 12 and a right strap 13. In this manner, the hat holder device 1 is securely attachable to the surface, and a probability of the hat holder device 1 detaching from the surface is minimized.

In some embodiments, at least one of the straps (12, 13) is adjustable or elastic to apply a perimeter force to the surface sufficient to removably attach the hat holder device 1 to the surface. In at least these embodiments, the hat holder device 1 is configured to be secured to a suitably sized surface. Alternatively, the perimeter force of the at least one adjustable or elastic strap may be used to secure the hat holder device 1 to a variably sized surface such as a compressible or expandable surface, or to an irregular surface, such as an hourglass or conical surface, as would be understood by the individual securing the hat holder device 1 to the surface.

In some embodiments, both of the straps (12, 13) are adjustable or elastic to apply the perimeter force to the surface sufficient to removably attach the hat holder device 1 to the surface. Similarly, the hat holder device 1 is configured to be secured to the suitably sized surface, or to the variably sized surface such as the compressible or expandable surface, or to the irregular surface, such as the hourglass or conical surface. In this manner, a magnitude of the perimeter force is maximized, thereby minimizing the probability of the hat holder device 1 detaching from the surface.

Figure 13:
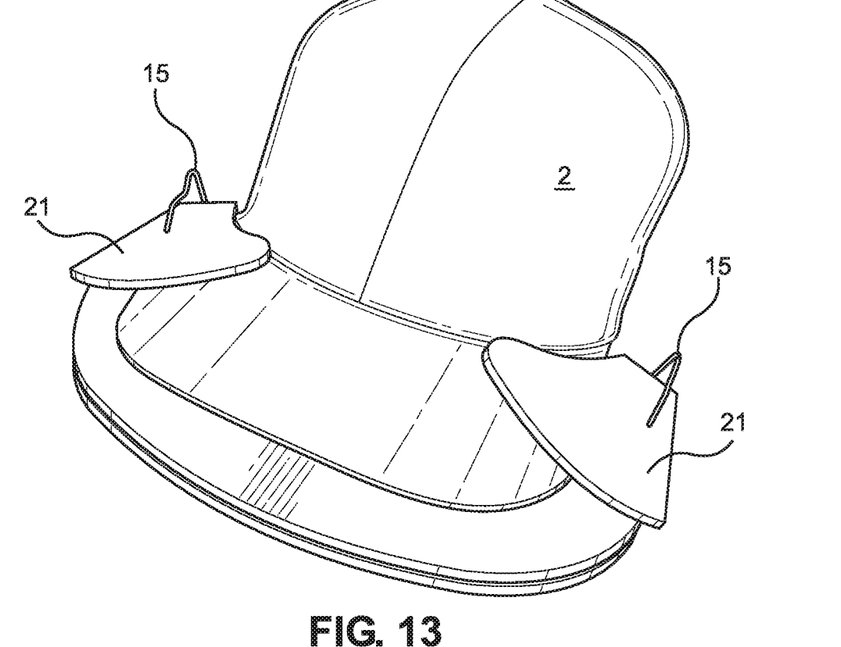
FIG. 13 depicts a perspective view of an alternate exemplary hat holder device, wherein the device includes a pair of wings configured to flexibly accommodate a curved bill of a billed hat therein, shown with the curved bill of the billed hat positioned between the pair of wings and a lower wall of the device.
Figure 14:
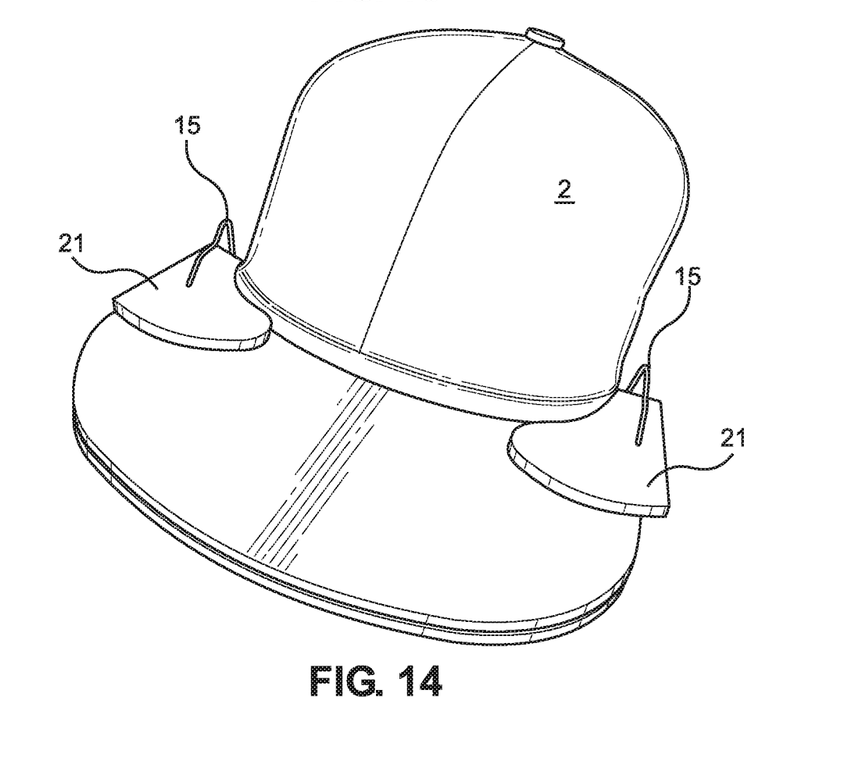
FIG. 14 depicts a perspective view of the alternate exemplary hat holder device, wherein the device includes the pair of wings configured to flexibly accommodate the curved bill of the billed hat therein, shown with the curved bill of the billed hat positioned within a bill pocket of the device.
Figures 15, 16:
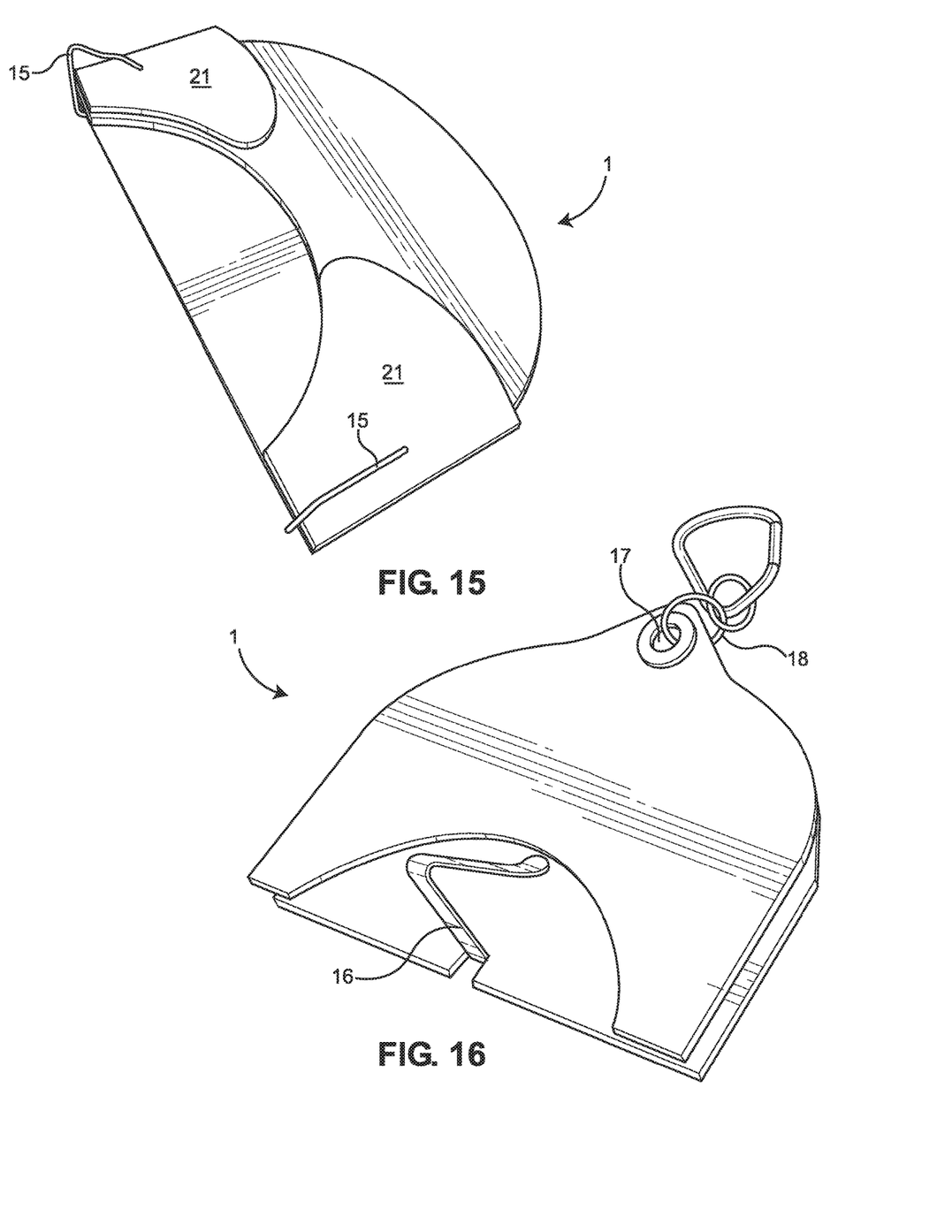
FIG. 15 depicts a perspective view of the alternate exemplary hat holder device, wherein the device includes a pair of wire clips for securing the pair of wings to the device.
FIG. 16 depicts a perspective view of an additional alternate exemplary hat holder device, wherein the device includes a central clip for securing the device to a surface or object, or for securing the billed hat within the bill pocket, and an aperture on a front portion of the device configured to secure the device to the surface or object, such as a keychain.

Referring now to FIGS. 13-15, there are depicted perspective views of an alternate exemplary hat holder device, wherein the device includes a pair of wings configured to flexibly accommodate a curved bill of a billed hat therein, shown with the curved bill of the billed hat positioned between the pair of wings 14 and a lower wall of the device (FIG. 13), with the curved bill of the billed hat positioned within a bill pocket of the device (FIG. 14), and without the billed hat (FIG. 15). In the shown embodiment, a pair of wings 14 is secured to an exterior of a lower wall of the hat holder device 1 by a pair of wire clips 15. The pair of wings 14 apply a force to the lower wall, wherein a magnitude of the force dissipates from an outer side of the lower wall toward a central portion of the lower wall. In this manner, the magnitude of the force is greater at the outer side or edges of the hat holder device 1, and the magnitude of the force is lower at the central portion of the hat holder device 1. When a curved bill of the billed hat 2 is inserted into the bill pocket of the hat holder device 1, the pair of wings 14 move slightly to flexibly accommodate a curvature of the curved bill, so as to secure the billed hat 2 therein by friction fit without altering the curvature of the curved bill of the billed hat 2. In this manner, the hat holder device 1 may be configured to removably secure curved bills of billed hats therein, without substantially or significantly affecting the curvature of the curved bills of these billed hats.

Referring now to FIG. 16, there is depicted a perspective view of an additional alternate exemplary hat holder device, wherein the device includes a central clip for securing the device to a surface or object, or for securing the billed hat within the bill pocket, and an aperture on a front portion of the device configured to secure the device to the surface or object, such as a keychain. A central clip 16 is disposed about a central portion of a lower surface of an upper wall of the hat holder device 1, and may be utilized to removably secure the hat holder device 1 to a surface or an object, according to need. In some embodiments, the central clip 16 may be utilized to removably secure the billed hat within the hat holder device 1, thereby preventing the billed hat from slipping or falling out of the hat holder device 1. In the shown embodiment, an aperture 17 is included on a front portion of the hat holder device 1, and is sized and configured to enable the hat holder device 1 to be removably secured to a portable object, such as a keychain 18. In this manner, the hat holder device 1 may easily be stored, carried, and transported when not in use, and kept with an individual's other personal belongings, such as keys, when not in use. In this manner, the individual is not at risk of misplacing the hat holder device 1, and attachment to any of a plurality of different objects is facilitated.

Figure 17:
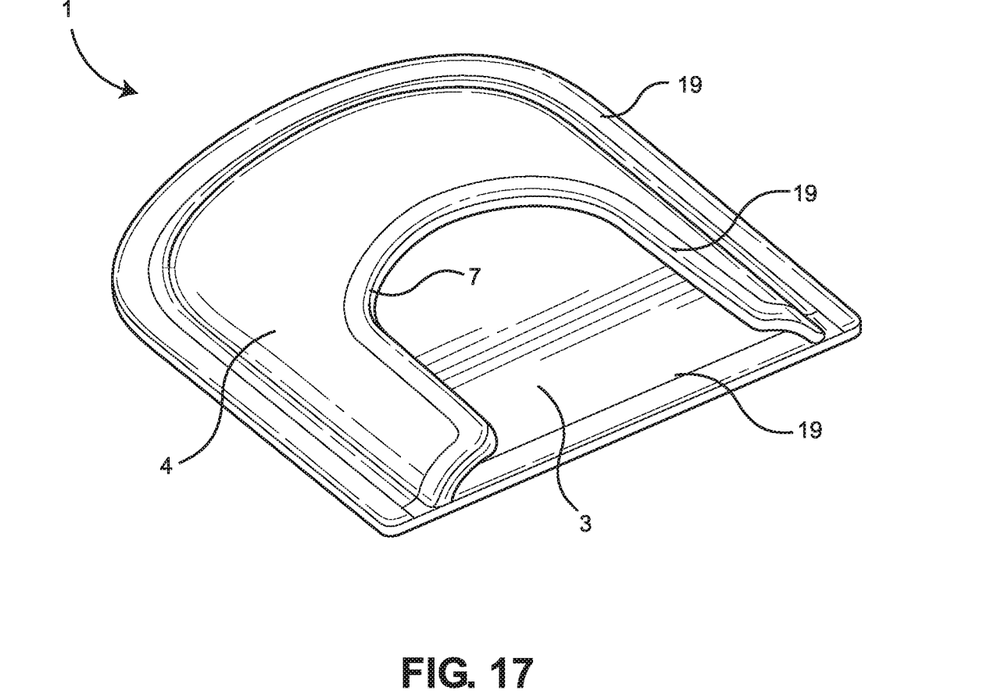
FIG. 17 depicts an upper perspective view of a particular exemplary hat holder device, wherein the device includes enclosed stitching to form the bill pocket.
Figure 18:
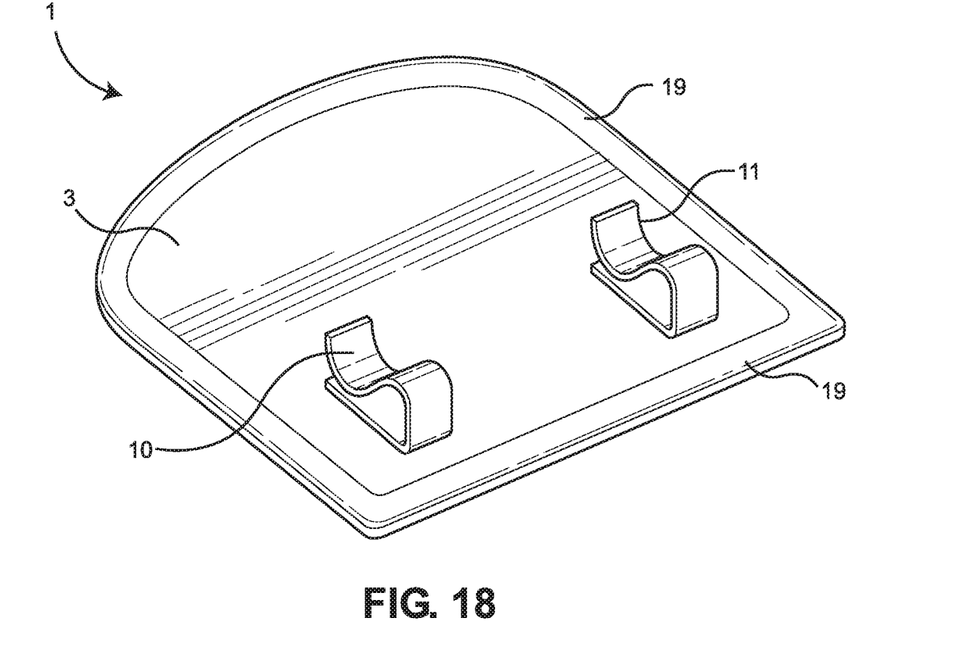
FIG. 18 depicts a lower perspective view of a particular exemplary hat holder device, wherein the device includes enclosed stitching and a pair of clips attached thereto.

Referring now to FIGS. 17 and 18, there are depicted an upper (FIG. 17) and a lower (FIG. 18) perspective view of a particular exemplary hat holder device, wherein the device includes enclosed stitching to form the bill pocket, and a pair of clips attached thereto. The hat holder device 1 includes stitching 19 which seals the upper wall 3 and the lower wall 4, and which also connects the upper wall 3 to the lower wall 4. In this manner, use of the attachment blocks in the design of the hat holder device 1 may be omitted. In such embodiments, the bill pocket of the hat holder device 1 is formed by an arcuate shape of the lower wall 4 relative to the upper wall 3. In this manner, the hat holder device 1 may be suited to removably secure the bill of the billed hat therein by frictional fit, regardless of whether the bill is curved, flat, or any degree of curvature therebetween. In the case of a flat bill, the edges of the bill may mostly engage the sides of the bill pocket, and in the case of a curved bill, the central portion of the bill may mostly engage the center of the bill pocket. In the shown embodiment, the curved cutout 7 of the lower wall 4 is integral with the lower wall 4, and is configured to accompany any of a variety of sizes and shapes of bills within the bill pocket. In addition, in the shown embodiment, the hat holder device 1 includes the clips (10, 11) on the upper surface of the upper wall 3, such that the clips (10, 11) are configured to secure the hat holder device to a surface, as described elsewhere herein.

Figure 19:
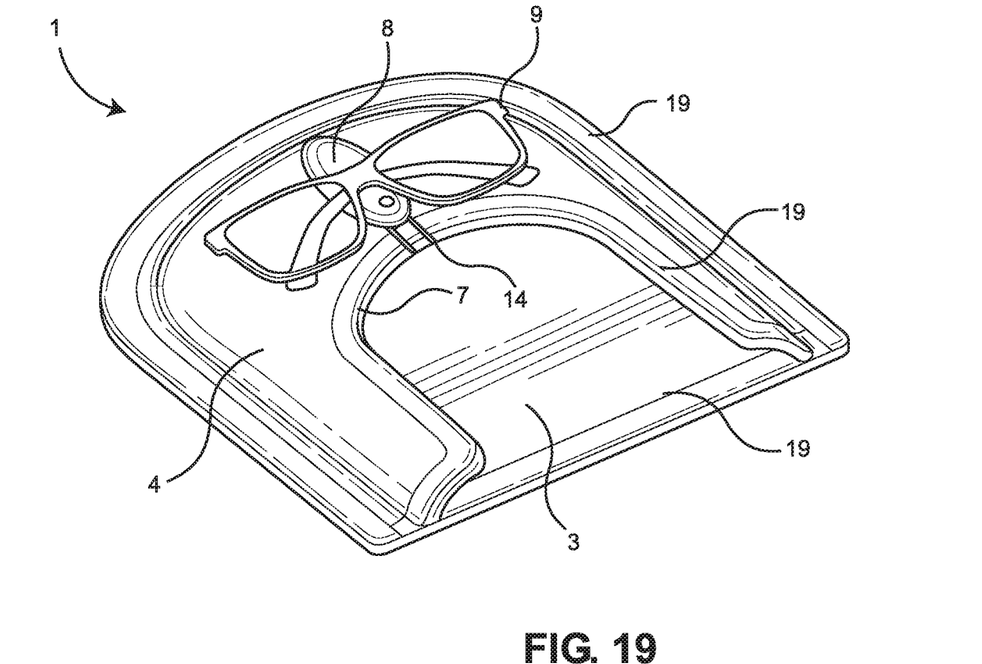
FIG. 19 depicts an upper perspective view of a particular exemplary hat holder device, wherein the device includes enclosed stitching to form the bill pocket, and also includes a pair of sunglasses attached thereto.
Figure 20:
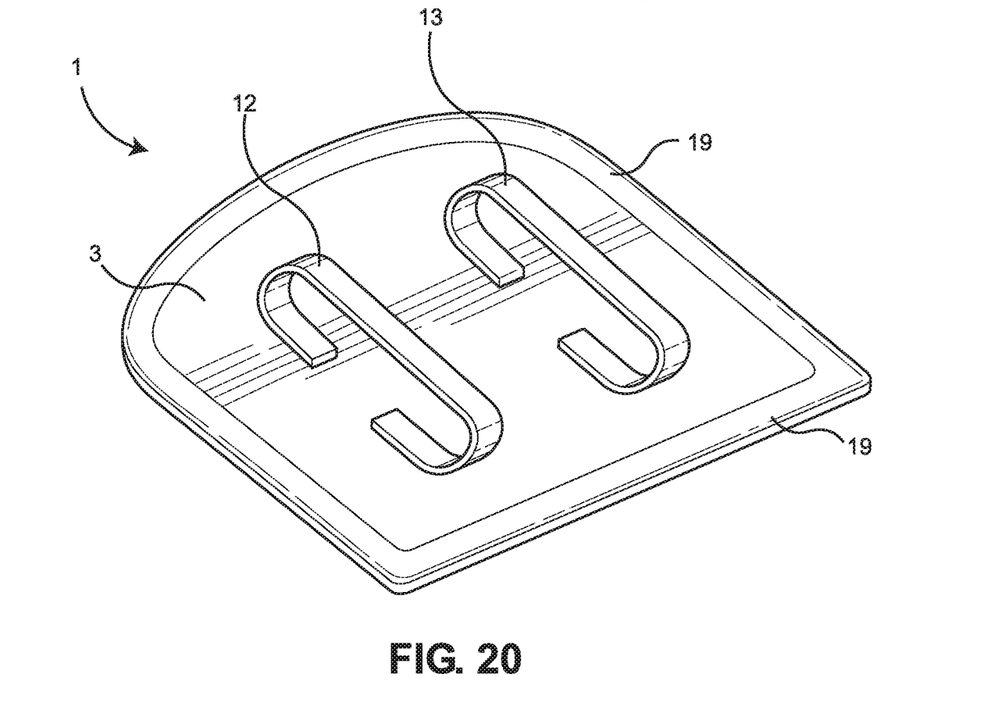
FIG. 20 depicts a lower perspective view of a particular exemplary hat holder device, wherein the device includes enclosed stitching and a pair of straps attached thereto.

Referring now to FIGS. 19 and 20, there are depicted an upper (FIG. 19) and a lower (FIG. 20) perspective view of a particular exemplary hat holder device, wherein the device includes enclosed stitching to form the bill pocket, and a pair of sunglasses and a pair of straps attached thereto. Generally, embodiments having stitching, e.g., enclosed stitching, may be combined with any other features of elements disclosed herein without departing from the scope of the present invention. In the shown embodiment, the hat holder device 1 includes stitching 19 which seals the upper wall 3 and the lower wall 4, and which also connects the upper wall 3 to the lower wall 4. The curved cutout 7 includes the sunglasses clip 8 attached thereon by the sunglasses holder attachment 14. The sunglasses clip 8 includes the pair of sunglasses 9 attached thereto. In this manner, embodiments with the stitching can be combined with the sunglasses holder for storage of the billed hat and the pair of sunglasses 9 together in one place. In like manner, embodiments with the stitching can be combine with alternate attachment means for attaching the hat holder device 1 to the surface, including but not limited to the pair of straps (12, 13), as described elsewhere herein.

Figure 21:
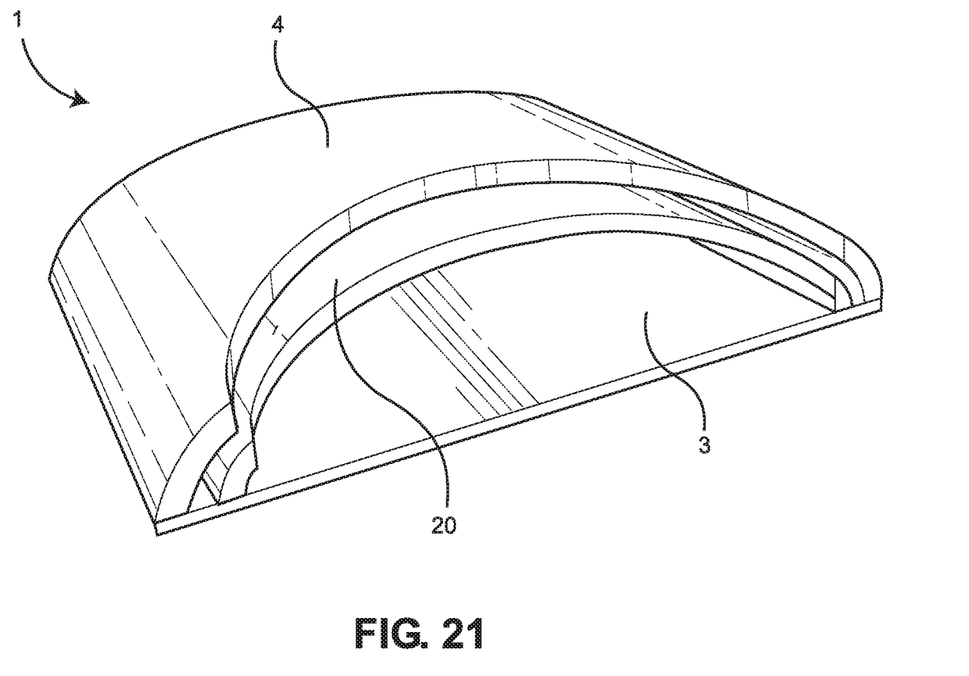
FIG. 21 depicts a rear perspective view of an exemplary curved bill pocket, formed by an upper wall, a lower wall, and an inner wall.

Referring now to FIG. 21, there is depicted a rear perspective view of an exemplary curved bill pocket, formed by an upper wall, a lower wall, and an inner wall. In the shown embodiment, the hat holder device 1 includes the upper wall 3 secured to both the lower wall 4 and an inner wall 20. In some embodiments, a flexibility or an elasticity of the inner wall 20 may be greater than a flexibility or an elasticity of the lower wall 4. In this manner, a frictional engagement between the bill pocket and the bill of the billed hat may be flexible up to a maximum position or size of the bill, as defined by a shape of the lower wall 4. In some embodiments with the curved bill pocket, the lower wall 4 and the inner wall 20 may be secured together, e.g., by stitching, and the hat holder device 1 formed without the inner wall 20 being immediately visible as shown in the figure. However, in some embodiments, the inner wall 20 is visible as a separate structure relative to the lower wall 4 and the upper wall 3. In this manner, manufacturing of the hat holder device 1 may be simplified.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A hat holder device for securing a billed hat to a surface, comprising:
    an upper wall, attached to a lower wall by a left attachment block and a right attachment block;
    wherein the upper wall, the lower wall, the left attachment block, and the right attachment block are sized to form a bill pocket therebetween configured to removably secure a bill of the billed hat therein;
    wherein an upper surface of the upper wall is attachable to the surface;
    a pair of wings attached to a portion of the hat holder device, wherein each pair of wings is attached to the hat holder device with a flexible wire; and
    wherein the pair of wings is configured to flexibly accommodate a curvature of the bill.

2. The hat holder device of claim 1, wherein a curvature of the upper wall and a curvature of the lower wall are adjustable.

3. The hat holder device of claim 1, wherein a curvature of the upper wall and a curvature of the lower wall are not adjustable.

4. The hat holder device of claim 1, wherein the upper wall and the lower wall are flat and parallel, wherein the bill is flat.

5. The hat holder device of claim 1, wherein the lower wall includes a curved cutout, configured to frictionally engage with an upper surface of the bill of the billed hat.

6. The hat holder device of claim 1, wherein the surface includes at least one surface selected from a group consisting of: a visor of a vehicle, a headrest of the vehicle, a backpack, an interior wall of a building, and an exterior wall of the building.

7. The hat holder device of claim 1, wherein the bill of the billed hat is removably securable within the bill pocket by a friction fit.

8. The hat holder device of claim 1, wherein the bill pocket is configured to removably secure the bill of the billed hat therein by frictional engagement between an inner surface of the lower wall and an upper surface of the bill of the billed hat, and by frictional engagement between an inner surface of the upper wall and a lower surface of the bill of the billed hat.

9. The hat holder device of claim 1, wherein a lower surface of the lower wall includes a sunglasses holder attached thereto, wherein the sunglasses holder is configured to removably secure a pair of sunglasses.

10. The hat holder device of claim 9, wherein the sunglasses holder includes a sunglasses clip configured to removably secure the pair of sunglasses by engaging a frame of the pair of sunglasses.

11. The hat holder device of claim 10, wherein the sunglasses clip is attached to the lower surface of the lower wall by a sunglasses holder attachment.

12. The hat holder device of claim 1, wherein the upper surface of the upper wall is attachable to the surface by at least one attachment mechanism selected from a group consisting of: a clip, and a strap.

13. The hat holder device of claim 12, wherein the clip is biased to apply a pinching force to the surface sufficient to removably attach the hat holder device to the surface.

14. The hat holder device of claim 12, wherein the strap is adjustable or elastic to apply a perimeter force to the surface sufficient to removably attach the hat holder device to the surface.

15. The hat holder device of claim 12, wherein the upper surface of the upper wall is attachable to the surface by a left clip and a right clip.

16. The hat holder device of claim 15, wherein the left clip and the right clip are biased to apply a pinching force to the surface sufficient to removably attach the hat holder device to the surface.

17. The hat holder device of claim 12, wherein the upper surface of the upper wall is attachable to the surface by a left strap and a right strap.

18. The hat holder device of claim 17, wherein the left strap and the right strap are adjustable or elastic to apply a perimeter force to the surface sufficient to removably attach the hat holder device to the surface.

19. The hat holder device of claim 1, further comprising a central clip disposed about a central portion of a lower surface of an upper wall of the hat holder device, wherein the central clip holds a hat in place when the brim is placed within the hat holder device.

\* \* \* \* \*